US011113139B2

(12) United States Patent  
Fernandez et al.

(10) Patent No.: US 11,113,139 B2  
(45) Date of Patent: Sep. 7, 2021

(54) PROACTIVE OUTAGE DETECTION BASED ON USER-REPORTED ISSUES

(71) Applicant: Espressive, Inc., Santa Clara, CA (US)

(72) Inventors: Francisco Fernandez, Castro Valley, CA (US); Daniel Valdivia Milanes, Mountain View, CA (US); Cesar Jacob Nieto Rueda, Guadalajara (MX); Rohit Kumar Suri, Fremont, CA (US)

(73) Assignee: Espressive, Inc., Santa Clara, CA (US)

( * ) Notice: Subject to any disclaimer, the term of this patent is extended or adjusted under 35 U.S.C. 154(b) by 58 days.

(21) Appl. No.: 16/276,345

(22) Filed: Feb. 14, 2019

(65) Prior Publication Data

US 2019/0278646 A1    Sep. 12, 2019

Related U.S. Application Data

(60) Provisional application No. 62/631,510, filed on Feb. 16, 2018.

(51) Int. Cl.
    *G06F 11/00* (2006.01)
    *G06F 11/07* (2006.01)

(52) U.S. Cl.
    CPC .......... *G06F 11/079* (2013.01); *G06F 11/076* (2013.01); *G06F 11/0709* (2013.01)

(58) Field of Classification Search
    CPC .. G06F 11/079; G06F 11/0709; G06F 11/076; G06F 11/0793; G06F 11/0769; G06F 11/0781; G06F 11/3082
    See application file for complete search history.

(56) References Cited

U.S. PATENT DOCUMENTS

| | | | |
|---|---|---|---|
| 2013/0086194 A1* | 4/2013 | Estes | G06F 11/3006 709/207 |
| 2014/0129536 A1* | 5/2014 | Anand | G06N 7/005 707/706 |
| 2016/0065736 A1* | 3/2016 | Pedersen | G06Q 30/016 379/266.07 |
| 2017/0300473 A1* | 10/2017 | Bhattacharya | G06Q 30/016 |

* cited by examiner

*Primary Examiner* — Joseph D Manoskey  
(74) *Attorney, Agent, or Firm* — Almanac IP Advisors LLP (57) ABSTRACT

An outage detection system identifies a reported incident as a candidate outage incident based upon an input received from a first user of a customer concerning the reported incident; determines whether the candidate outage incident relates to at least a threshold number of prior candidate outage incidents reported by other users; and, if so, associates the candidate outage incident with the prior candidate outage incidents, and identifies the candidate outage incident and the associated prior candidate outage incidents as relating to an outage.

18 Claims, 5 Drawing Sheets

PROACTIVE OUTAGE DETECTION BASED ON USER-REPORTED ISSUES

CROSS REFERENCE TO RELATED APPLICATIONS

This applications claims the benefit of priority of U.S. provisional Application No. 62/631,510, filed Feb. 16, 2018, and incorporated by reference in its entirety herein.

BACKGROUND

Field of the Disclosure

This disclosure relates to the field of customer service management, and more particularly to detecting outages.

Description of Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Conventional approaches to detecting outages rely on human service agents at an information technology ("IT") help desk to determine whether an incident reported by a user qualifies as an outage, typically by determining whether multiple incidents relate to the same technical issue. Multiple users call into the help desk, some reporting technical issues relating to the same outage. However, the users may use different language to report an issue, such as, "My email is not working."; "I can't access my email."; "I'm receiving a message that the email server is down."

In response, each service agent interprets the user's report to determine whether it may indicate an outage. The agent creates a ticket and undertakes troubleshooting. A problem with existing approaches is that service agents are usually not aware of incidents handled by other agents at the same or different locations, which may be geographically distant, even spread across countries. Thus, multiple agents may be working on identifying and resolving technical issues related to the same outage.

Even if service agents were able to communicate with each other, conventional systems would not support communications frequently enough to detect a trend in reported incidents, which would help indicate an outage affecting many users. Also, using inter-agent communication of incidents over conventional means, e.g., chat windows, to support outage detection would be difficult to scale. It is desired to develop an approach that would be more efficient and increase productivity of the IT help desk.

SUMMARY OF THE DISCLOSURE

Embodiments of the disclosure provide an outage detection system (ODS) for detecting outages in one or more objects. An "outage" may refer to unavailability of, or a decrease in quality of a system or service due to unexpected behavior of that particular system or service, or an issue impacting users of the system or service that results in the system or service not being usable at a level they reasonably expect (e.g., at a level specified by a service level agreement). If an object experiences an outage, it affects the productivity of more than one user.

"Objects" may comprise systems or services, including, for example, email systems, enterprise systems, CRM systems, cloud services, shared devices such as printers, and systems such as elevators. An object may experience an outage affecting multiple users of the customer. Each object is accessible by one of more users of a customer of the provider of the ODS. A "user" generally refers to an end user of an object. The term "customer" may refer to an actual customer of the provider of the outage detection system or any entity that employs the outage detection system. The embodiments of the disclosure are particularly advantageous for large scale IT systems, e.g., employing over 20 agents, detecting and handling incidents for a company with over 1000 employees, or having an agent to employee ratio of 1agent to 25-100 employees.

Embodiments of the ODS may identify a reported incident as a candidate outage incident based upon an input received from a first user of a customer concerning the reported incident; determine whether the candidate outage incident relates to at least a threshold number of prior candidate outage incidents reported by other users; and, if so, (a) associate the candidate outage incident with the prior candidate outage incidents, and (b) identify an outage relating to the candidate outage incident and the associated prior candidate outage incidents. The identification serves as detection of an outage.

After the system identifies an outage, the related candidate outage incident and prior outage incidents become a verified outage incident and verified prior outage incidents, respectively. For the sake of convenience, however, such verified outage incidents may still be referred to herein as "candidate" outage incident and "candidate" prior outage incidents, respectively.

The input received from a user may be a natural language phrase. The term "first user" herein does not refer to the first user who, in a temporal sense, reports the incident that is identified as a candidate outage incident, but rather, for example, the current user reporting an incident that is identified as a candidate outage incident. The first prior candidate outage incident (in a temporal sense) may be referred to herein as the "parent" incident, with subsequent associated incidents each referred to as a "child" incident. Identification of the reported incident as an outage may be performed by service agent or via computer using, e.g., machine learning/artificial intelligence, particularly neural networks.

As an example, assume the following users (denoted by number) report a technical issue relating to the same email outage in sequential order: 1 2 3 4 5 6 7. In this example, User 1 first reported a problem with email, and later so did Users 2-3. Assume that the system requires four related, reported incidents to trigger identification of an outage. Thus, in response to User 4 reporting on the same issue, the system identifies an outage. Even though User 4 triggered the outage, the system determines it was started by User 1 and denotes the incident for User 1 the "parent," and relates the incidents for User 2-4 as "children." Finally, as Users 5-7 report on the same technical issue, those incidents also become children to incident 1.

Identifying an outage may be based at least in part upon a time difference between (a) receiving the input from the first user concerning the (e.g., most recent) reported incident and (b) receiving inputs from the other users concerning the prior candidate outage incidents.

The ODS of embodiments of the disclosure may provide information for presentation to the first user that a technical issue relating to the associated outage incident is known. The associated outage incident may concern the same technical issue as the prior candidate outage incidents.

The second user may be a user (e.g., employee) of the same customer as the prior users.

In embodiments, the second user may be a user of another customer, in which case the ODS may detect outages across customers, e.g., a cloud server serving multiple customers may be down.

The ODS of embodiments of the disclosure may identify the identified reported incident as a global outage incident or a local outage incident. Local incidents may be specific to the user's location, whereas global incidents are not.

The ODS of embodiments of the disclosure may inform an IT service agent associated with the customer that the associated candidate (now verified) outage incident is associated with the prior candidate (now verified) outage incidents. Informing the IT service agent may involve informing the IT service agent that the associated outage incident relates to the first user and the other users. The ODS may close an outage record for the candidate outage incident and the prior candidate outage incidents upon resolution of the prior candidate outage incident first reported (in time) by one of the other users. Thus, instead of multiple agents working on the same outage, the ODS enables just one agent to resolve an outage to the benefit of all affected users and the entire help desk by increasing productivity and reducing redundancy. The ODS may provide information for presentation to the first user and the other users to inform them of resolution of the candidate outage incident and the prior candidate outage incidents, respectively.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

Figure 1:
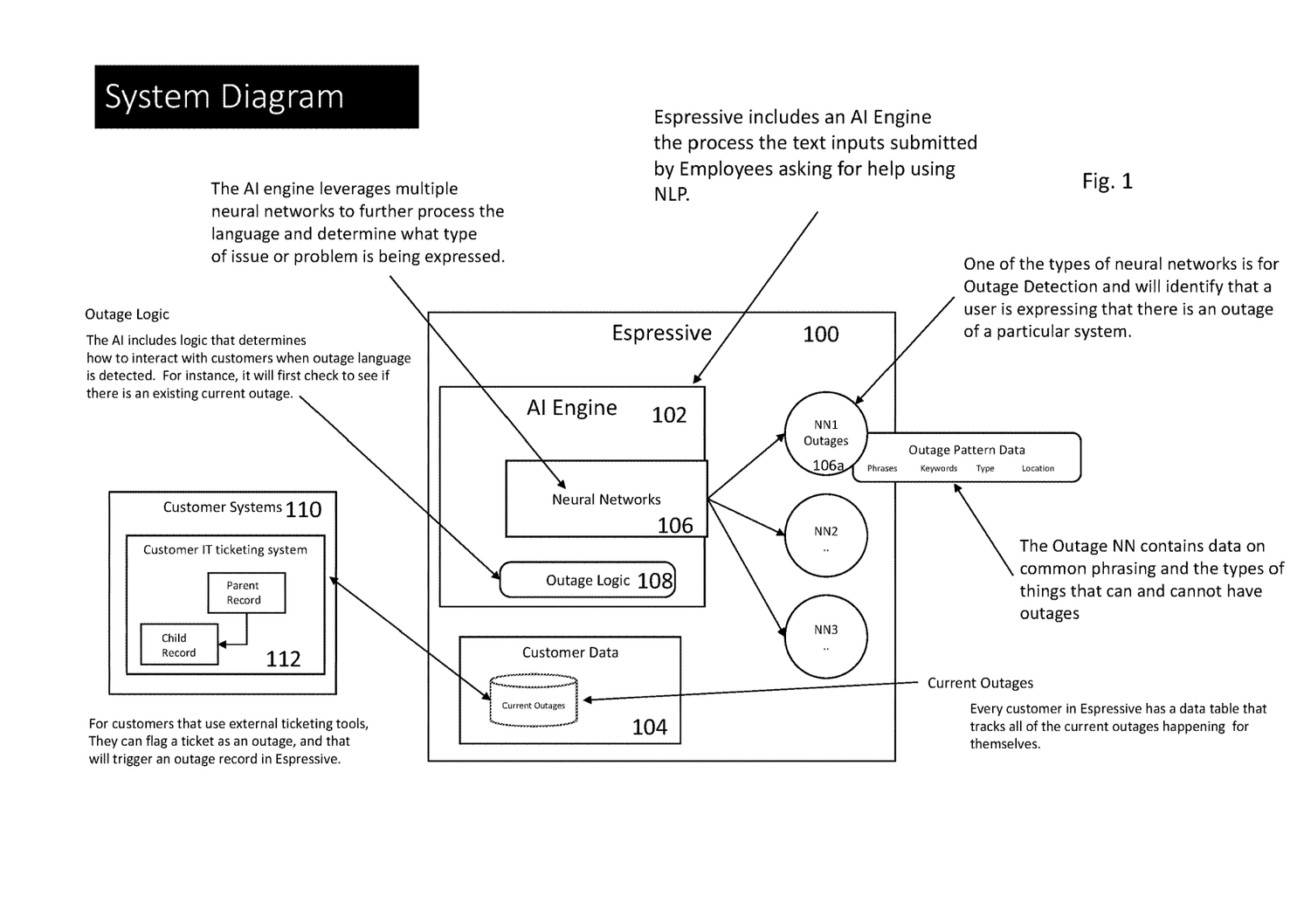
FIG. 1 illustrates an outage detection system, according to embodiments of the disclosure

FIG. 1 illustrates an outage detection system 100, according to embodiments of the disclosure. The system 100 includes an artificial intelligence (AI) engine 102 and a database 104. The AI engine includes neural networks 106 and outage logic 108, according to embodiments of the disclosure. According to embodiments of the disclosure, natural language processing may be employed to carry out the operations of the disclosure.

According to embodiments of the disclosure, the natural language information may be in the form of text input by a user or information from one or more coded optical indicia, such as a QR code or a bar code. A QR code refers to graphical image that is coded so that it can be interpreted by a QR Code scanner or reader. Unlike bar codes of old, which could only store alphanumeric characters, a QR code can contain more advanced information such as string of text or a web URI. Via a customer system 110, the user may activate an optical code reading app to scan an optical code. An app, such as a QR code app, transforms the resulting scanned data into a format readable by another application that processes the data, according to embodiments of the disclosure. Those skilled in the relevant art will understand that the two apps may be combined into one app.

The system 100 provides outage detection for customer systems 110 of the customers of the outage detection system 100, according to embodiments of the disclosure. A customer system 110 may include an associated customer IT ticketing system 112 for tracking outages. The ticketing system 112 may be an internal system maintained by the customer or an external system outsourced by the customer.

The AI Engine 102 uses natural language processing to process the text inputs submitted by users asking for help, according to embodiments of the disclosure. The AI engine 102 leverages multiple neural networks, such as 106a, to process the natural language input to identify user input as reporting a candidate outage incident for a particular object and determine what type of issue is being expressed.

Referring to the example of Table 1, a log of customer outage data stored in data base 104 may be specific to each customer, tracking all outages and enabling the outage logic 108 to know if there is an active outage for a given system (object) and location for each customer.

TABLE 1

| Outage Number | System | Status | Location | Start Time | End Time | Ticket # |
| --- | --- | --- | --- | --- | --- | --- |
| 01 | Email | Active | Global | Jan. 12, 2018 3:22pm | Jan. 12, 2018 5:13pm | Incident 1234 |
| 02 | SFDC | Active | Global | Jan. 12, 2018 3:22pm | Jan. 12, 2018 5:13pm | Incident 4345 |
| 03 | Elevator | Resolved | 123 Main Street | Jan. 12, 2018 3:22pm | Jan. 12, 2018 5:13pm | Incident 3451 |

TABLE 1-continued

| Outage Number | System | Status | Location | Start Time | End Time | Ticket # |
|---|---|---|---|---|---|---|
| 04 | Printer | Active | 123 Main Street/ Floor 2 | Jan. 12, 2018 3:22pm | Jan. 12, 2018 5:13pm | Incident 1432 |

Referring to Table 2, the neural network 106a devoted to outage identification stores data on common phrases associated with keywords related to corresponding objects, the types of objects that can and cannot have outages, as indicated by the "valid outage?" column, and whether an outage should be limited to certain geographies. The neural network 106a identifies whether a user input phrase concerning a technical incident refers to a candidate outage incident, an incident of the type that may qualify as being part of an outage. In this example, a PC and an iPhone cannot have valid outages because those objects are usually not shared by multiple users and a failure affecting either object would generally not affect the productivity of more than one user. Note that the table entries are exemplary only, and may not be true for all systems. The neural network 106a employs a very large data set based upon incident reporting for many systems.

TABLE 2

| Phrases | Keyword | Valid Outage? | Geography |
|---|---|---|---|
| Email is not working | Email | Yes | Global |
| Can't get into SDFC | SFDC | Yes | Global |
| Elevator is broken | Elevator | Yes | Building |
| PC is not working | PC | No | |
| Can't connect to internet | Internet | Yes | Building |
| Outlook is not connecting | Outlook | Yes | Global |
| Front Door is stuck | Front Door | Yes | Building |
| Printer not working | Printer | Yes | Floor |
| My iPhone is dead | iPhone | No | |

Figure 2A:
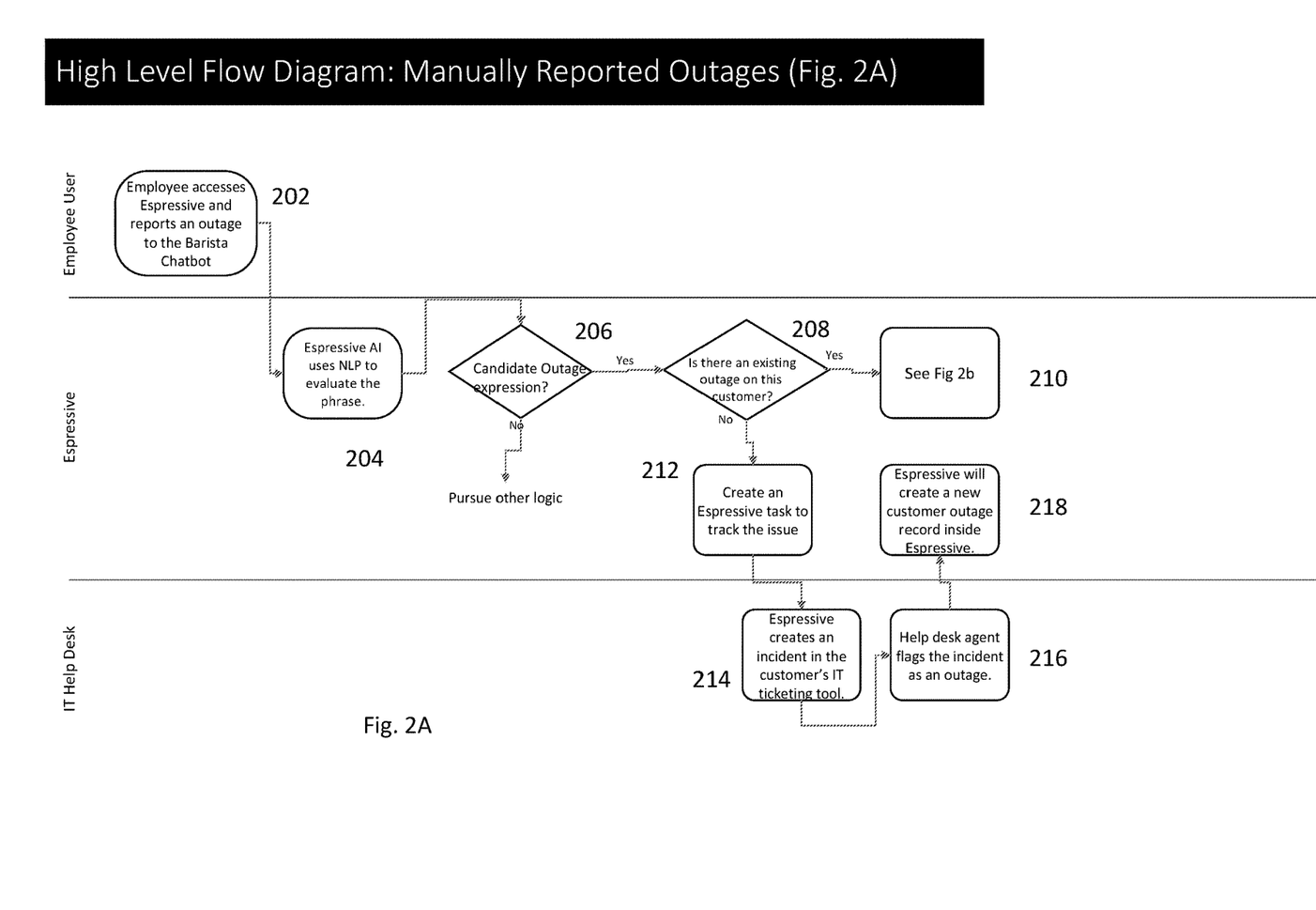
FIG. 2A illustrates a flow diagram for outage detection with manual reporting of outages, according to embodiments of the disclosure.

FIG. 2A is a general flow diagram that illustrates an example of outage detection with manual reporting of outages, as follows:

1. Employee Joe is having a problem. He goes into the outage reporting Espressive app and informs Barista, a chatbot, that "SFDC is down." (202) ("SFDC" refers to the Salesforce cloud service.) The chatbot is a user interface provided by the Espressive system 100.

2. The neural network 106a uses NLP to determine that the phrase "SFDC is down" is related to outages (i.e., whether it refers to a candidate outage incident), and that the system is SFDC (204).

3. The outage logic 108 checks the customer outage data to determine whether there is an existing record of an outage for SFDC for the customer (208).

4. If not, the outage logic 108 creates a task and a record in data base 104 to track the issue for the user (212).

5. Since this customer uses ServiceNow cloud computing services, the outage logic 108 also creates a ServiceNow incident in the customer's ServiceNow service in customer ticketing system 112 that is linked to the Espressive task (214).

6. Sally of the customer's IT Help Desk takes assignment of the "SFDC is down" ticket. Sally validates that SFDC is down and determines that this can impact more sales people like Joe, so she updates the incident by flagging it as an outage (216).

7. The outage logic 108 receives the update from Sally, and creates an outage record in data base 104 for system (object) SFDC (218). The outage logic 108 determines that the impacted geography of SFDC outages are global.

Figure 2B:
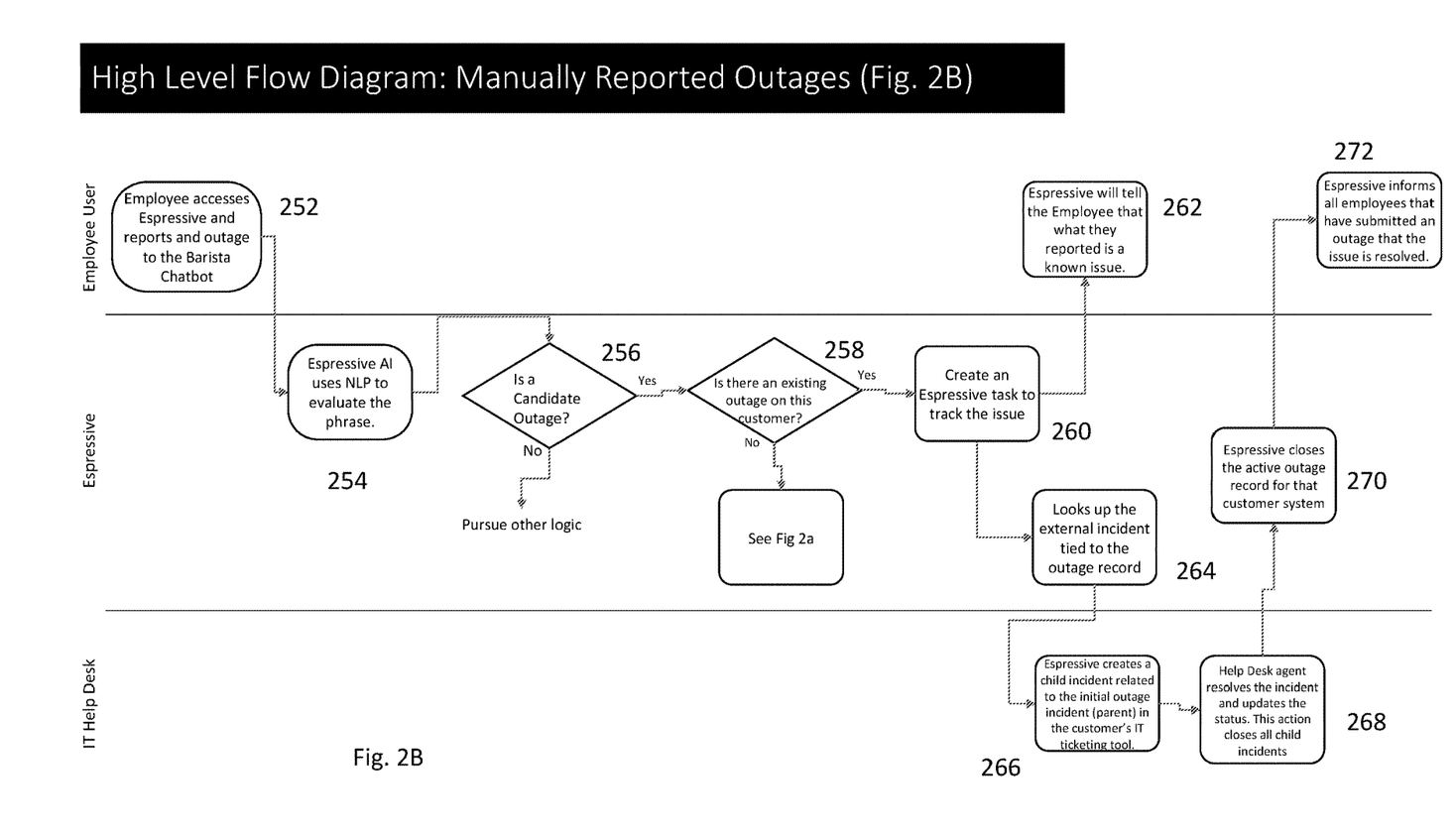
FIG. 2B illustrates a flow diagram for outage detection with manual reporting of outages, according to embodiments of the disclosure.

FIG. 2B is a general flow diagram that illustrates an example in which the reported incident corresponds to an existing outage for the customer, as follows:

1. Another Employee, Mary, is noticing a similar problem as Joe's. She enters the Espressive outage reporting app on her computer, and informs the Barista chatbot that "I can't get into Salesforce" (252).

2. The neural network 106a evaluates and determines that the phrase "I can't get into Salesforce" is related to outages (254, 256) (i.e., whether it refers to a candidate outage incident), and that the system is SFDC, since "Salesforce" is the same as SFDC.

3. The outage logic 108 checks the customer outage data and determines that there is an existing outage record for SFDC (258).

4. The outage logic 108 creates a task and a record in data base 104 to track the issue for the user (260).

5. Since this is a known outage, the outage logic 108 causes the Barista chatbot to tell Mary that the issue is known and being worked on (262).

6. The outage logic 108 looks up the external incident on the customer's system 112 tied to the outage record to associate the child outage incident to the parent outage incident (264). Since the customer in this example uses ServiceNow, the outage logic 108 also creates a ServiceNow incident in the customer ticketing system 112 that is linked to the Espressive outage detection system task. Additionally, the new incident is also linked by the outage logic 108 to the original or parent incident that is recorded with the customer outage record in the customer ticketing system 112 as well as in the data base 104 (266). This makes this new incident a child incident to that original parent.

7. Sally on the IT Help Desk sees that the outage incident has a new child and knows that another employee reported the same outage. No other IT resource (e.g., service agent) needs to be assigned. This is a great productivity and efficiency gain over conventional approaches.

8. Sally fixes the problem by calling SFDC. She then marks the incident as resolved (268). In embodiments, the resolved incident is the first reported, parent incident associated with the outage.

9. The customer ticketing system 112 then updates the status of all the child tickets as also resolved.

10. The outage logic 108 receives the update from Sally, and closes the outage record for system SFDC maintained in data base 104 for the customer (270).

11. The outage logic 108 updates all of the tasks tied to the parent and child incidents, and notifies all the employees that reported on the outage incident (including Mary), that the outage has been successfully resolved (272). The outage logic 108 may notify Mary directly over the Espressive outage detection app accessed by Mary, or indirectly by sending notification through the customer ticketing system 112.

In embodiments, the outage logic 108 may close an outage record (e.g., represented in a table of all associated outage incidents) for the candidate outage incident and the prior candidate outage incidents upon resolution of any of the prior candidate outage incidents, not just upon resolution of the parent incident.

Figure 3:
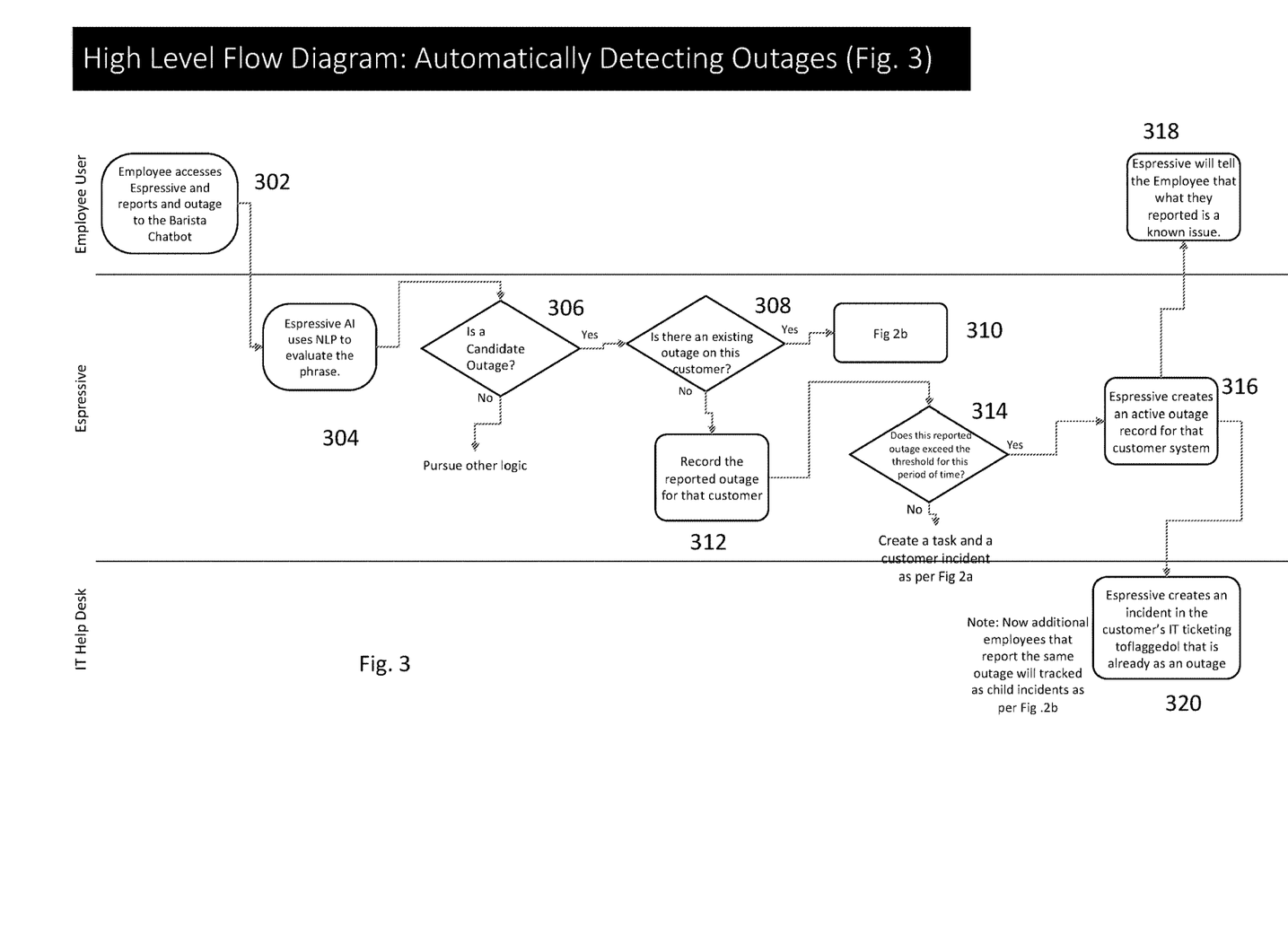
FIG. 3 illustrates a flow diagram for automatically detecting outages, according to embodiments of the disclosure.

FIG. 3A is a general flow diagram that illustrates another example:

1. Employee Frank is having a problem. He goes into Espressive outage reporting app and tells the Barista chatbot that "SFDC is not responding" (302).

2. The neural network 106a uses NLP to evaluate and determine whether the phrase "SFDC is not responding" is related to outages (i.e., whether it refers to a candidate outage incident), and that the system is SFDC (304, 306). In this case, it is a candidate outage incident.

3. The outage logic 108 checks the customer outage data and determines that there is not an existing outage record for SFDC (308).

4. The Espressive outage logic 108 records in the customer log in data base 104 that this is a reported candidate outage incident for SFDC (312).

5. The Espressive AI outage detection outage logic 108 evaluates the logs, and determines that in the last 10 minutes, there have now been 6 reported candidate outage incidents for SFDC (314).

6. The 6 reported candidate outage incidents exceed the threshold of 5 that has been set as the outage threshold for outages in this example. Thus, the six candidate outage incidents are verified as belonging to an outage. The outage logic 108 thus creates an outage record for the SFDC system for this customer (316).

7. The outage logic 108 causes the Barista chatbot to inform Frank that the issue is known and being worked on, and causes the outage logic 108 to create a task to track the issue for the user (318)

8. Since this customer uses ServiceNow, the outage logic 108 also creates a ServiceNow incident in the customer ticketing system 112 that is linked to the Espressive task (320). Additionally, the outage logic 108 flags the new incident as an outage.

9. Sally on the IT Help Desk takes assignment of the "SFDC is not responding" ticket.

10. Sally notices that it is an outage record and no longer has to manually flag it herself. For subsequent candidate outage incidents, the outage logic 108 may inform the customer ticketing system 112 and incident-reporting employees of child outage incidents. Thus, Sally knows that there could be more child incidents added to the first, parent incident.

Computer System Implementation

Figure 4:
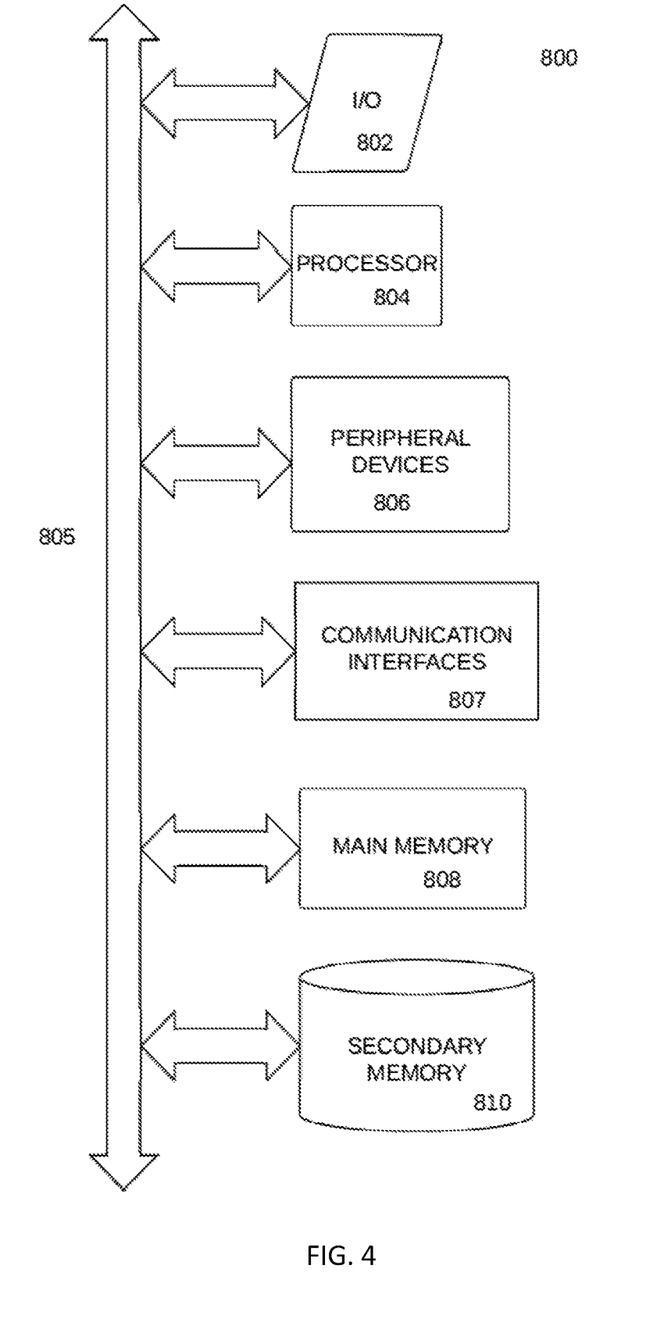
FIG. 4 illustrates an example of a computer system that may be used to execute instructions stored in a non-transitory computer readable medium (e.g., memory) in accordance with embodiments of the disclosure.

FIG. 4 illustrates an example of a computer system 800 that may be used to execute program code stored in a non-transitory computer readable medium (e.g., memory) in accordance with embodiments of the disclosure. The computer system includes an input/output subsystem 802, which may be used to interface with human users and/or other computer systems depending upon the application. The I/O subsystem 802 may include, e.g., a keyboard, mouse, graphical user interface, touchscreen, or other interfaces for input, and, e.g., an LED or other flat screen display, or other interfaces for output, including application program interfaces (APIs). Elements of embodiments of the disclosure, such as the AI engine 102 and its component neural networks 106 and outage logic 108, or the outage detection system 100 as a whole, may be implemented with a computer system or cluster of computer systems, such as that of computer system 800.

Program code may be stored in non-transitory computer-readable media such as persistent storage in secondary memory 810 or main memory 808 or both. Main memory 808 may include volatile memory such as random access memory (RAM) or non-volatile memory such as read only memory (ROM), as well as different levels of cache memory for faster access to instructions and data. Secondary memory may include persistent storage such as solid state drives, hard disk drives or optical disks. One or more processors 804 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 804. The processor(s) 804 may include specialized processing units (e.g., GPUs) for handling computationally intensive tasks.

The processor(s) 804 may communicate with external networks via one or more communications interfaces 807, such as a network interface card, WiFi transceiver, etc. A bus 805 communicatively couples the I/O subsystem 802, the processor(s) 804, peripheral devices 806, communications interfaces 807, memory 808, and persistent storage 810. Embodiments of the disclosure are not limited to this representative architecture. Alternative embodiments may employ different arrangements and types of components, e.g., separate buses for input-output components and memory subsystems.

Those skilled in the art will understand that some or all of the elements of embodiments of the disclosure, and their accompanying operations, may be implemented wholly or partially by one or more computer systems including one or more processors and one or more memory systems like those of computer system 800. In particular, the elements of AI engine and any other automated systems or devices described herein may be computer-implemented. Some elements and functionality may be implemented locally and others may be implemented in a distributed fashion over a network through different servers, e.g., in client-server fashion, for example. In particular, server-side operations may be made available to multiple clients in a software as a service (SaaS) fashion.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

What is claimed is:

1. One or more non-transitory computer-readable media storing instructions for detecting outages in one or more objects, wherein each object is accessible by one or more users of a customer, wherein the instructions, when executed by one or more computing devices, cause at least one of the one or more computing devices to:
   identify a reported incident as a candidate outage incident based upon an input received from a first user of a customer concerning the reported incident;
   determine whether the candidate outage incident relates to at least a threshold number of prior candidate outage incidents reported by other users; and if so, associate the candidate outage incident with the prior candidate outage incidents, identify an outage relating to the candidate outage incident and the associated prior candidate outage incidents, and provide information for presentation to the first user and the other users to inform them of resolution of the candidate outage incident and the prior candidate outage incidents, respectively, wherein the one or more objects is one or more physical objects or software, and at least one of the candidate outage incidents relating to the identified outage is resolved.

2. The one or more non-transitory computer-readable media of claim 1, wherein identifying an outage is based at least in part upon a time difference between (a) receiving the input from the first user concerning the reported incident and (b) receiving inputs from the other users concerning the prior candidate outage incidents.

3. The one or more non-transitory computer-readable media of claim 1, wherein the input is a natural language phrase.

4. The one or more non-transitory computer-readable media of claim 1, storing at least one instruction that, when executed by one or more computing devices, causes at least one of the one or more computing devices to identify the identified reported incident as a global outage incident or a local outage incident.

5. The one or more non-transitory computer-readable media of claim 1, storing at least one instruction that, when executed by one or more computing devices, causes at least one of the one or more computing devices to inform an IT service agent associated with the customer that the associated candidate outage incident is associated with the prior candidate outage incidents.

6. The one or more non-transitory computer-readable media of claim 1, storing at least one instruction that, when executed by one or more computing devices, causes at least one of the one or more computing devices to close an outage record for the candidate outage incident and the prior candidate outage incidents upon resolution of any of the prior candidate outage incidents.

7. The one or more non-transitory computer-readable media of claim 1, storing at least one instruction that, when executed by one or more computing devices, causes at least one of the one or more computing devices to close an outage record for the candidate outage incident and the prior candidate outage incidents upon resolution of the prior candidate outage incident first reported (in time) by one of the other users.

8. A computer-implemented method for detecting outages in one or more objects, wherein each object is accessible by one or more users of a customer, the method comprising:

identifying a reported incident as a candidate outage incident based upon an input received from a first user of a customer concerning the reported incident;

determining, by a processor, whether the candidate outage incident relates to at least a threshold number of prior candidate outage incidents reported by other users; and if so, (a) associating, by a processor, the candidate outage incident with the prior candidate outage incidents, (b) identifying an outage relating to the candidate outage incident and the associated prior candidate outage incidents, and (c) providing information for presentation to the first user and the other users to inform them of resolution of the candidate outage incident and the prior candidate outage incidents, respectively, wherein the one or more objects is one or more physical objects or software, and at least one of the candidate outage incidents relating to the identified outage is resolved.

9. The method of claim 8, wherein identifying an outage is based at least in part upon a time difference between (a) receiving the input from the first user concerning the reported incident and (b) receiving inputs from the other users concerning the prior candidate outage incidents.

10. The method of claim 8, wherein the input is a natural language phrase.

11. The method of claim 8, further comprising identifying the identified reported incident as a global outage incident or a local outage incident.

12. The method of claim 8, further comprising informing an IT service agent associated with the customer that the associated candidate outage incident is associated with the prior candidate outage incidents.

13. The method of claim 8, further comprising closing an outage record for the candidate outage incident and the associated prior candidate outage incidents upon resolution of any of the prior candidate outage incidents.

14. A system for detecting outages in one or more objects wherein each object is accessible by one or more users of a customer, the system comprising:

one or more memories storing instructions;

one or more processors coupled to at least one of the one or more memories for executing instructions to cause the system to:

identify a reported incident as a candidate outage incident based upon an input received from a first user of a customer concerning the reported incident;

determine whether the candidate outage incident relates to at least a threshold number of prior candidate outage incidents reported by other users; and if so, associate the candidate outage incident with the prior candidate outage incidents, identify an outage relating to the candidate outage incident and the associated prior candidate outage incidents, and close an outage record for the candidate outage incident and the prior candidate outage incidents upon resolution of any of the prior candidate outage incidents, wherein the one or more objects is one or more physical objects or software, and at least one of the candidate outage incidents relating to the identified outage is resolved.

15. The system of claim 14, wherein identifying an outage is based at least in part upon a time difference between (a) receiving the input from the first user concerning the reported incident and (b) receiving inputs from the other users concerning the prior candidate outage incidents.

16. The system of claim 14, wherein the input is a natural language phrase.

17. The system of claim 14, at least one of the one or more memories storing at least one instruction to cause the system to identify the identified reported incident as a global outage incident or a local outage incident.

18. The system of claim 14, at least one of the one or more memories storing at least one instruction to cause the system to inform an IT service agent associated with the customer that the associated candidate outage incident is associated with the prior candidate outage incidents.

* * * * *